United States Patent
Wei

(10) Patent No.: US 9,906,350 B2
(45) Date of Patent: Feb. 27, 2018

(54) METHOD OF HANDLING INTERFERENCE MITIGATION AND RELATED COMMUNICATION DEVICE

(71) Applicant: ACER INCORPORATED, New Taipei (TW)

(72) Inventor: Hung-Yu Wei, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

(21) Appl. No.: 14/265,385

(22) Filed: Apr. 30, 2014

(65) Prior Publication Data

US 2014/0334347 A1 Nov. 13, 2014

Related U.S. Application Data

(60) Provisional application No. 61/820,718, filed on May 8, 2013.

(51) Int. Cl.
*H04L 5/00* (2006.01)
*H04L 5/14* (2006.01)
*H04W 52/24* (2009.01)

(52) U.S. Cl.
CPC .......... *H04L 5/0073* (2013.01); *H04L 5/1469* (2013.01); *H04L 5/001* (2013.01); *H04L 5/0023* (2013.01); *H04L 5/0035* (2013.01); *H04L 5/0069* (2013.01); *H04W 52/243* (2013.01)

(58) Field of Classification Search
CPC ........ H04L 5/0073; H04L 5/14; H04L 5/1469
See application file for complete search history.

(56) References Cited

U.S. PATENT DOCUMENTS

| | | | | |
|---|---|---|---|---|
| 2008/0298486 A1* | 12/2008 | Venturino | ............. | H04L 5/0007 375/260 |
| 2010/0099449 A1* | 4/2010 | Borran | ................ | H04W 52/243 455/501 |
| 2013/0044697 A1* | 2/2013 | Yoo | ..................... | H04W 72/082 370/329 |
| 2014/0112216 A1* | 4/2014 | Seo | ........................ | H04J 11/005 370/280 |
| 2015/0045076 A1* | 2/2015 | Pan | ........................ | H04W 16/10 455/501 |

FOREIGN PATENT DOCUMENTS

| | | |
|---|---|---|
| CN | 101527593 A | 9/2009 |
| CN | 101527594 A | 9/2009 |
| WO | 2012083500 A1 | 6/2012 |
| WO | 2013002572 A2 | 1/2013 |

* cited by examiner

*Primary Examiner* — Un C Cho
*Assistant Examiner* — Jeremy Costin
(74) *Attorney, Agent, or Firm* — Winston Hsu

(57) ABSTRACT

A method of handling interference mitigation for a first cell in a first cell cluster of a time-division duplexing (TDD) system comprises determining an interference mitigation for a communication operation between the first cell and a communication device in the TDD system, to reduce an interference caused by the communication operation to a second cell in a second cell cluster of the TDD system; and performing the communication operation according to the interference mitigation.

5 Claims, 8 Drawing Sheets

| UL/DL configuration | Subframe number |
|---|---|
| | 0 1 2 3 4 5 6 7 8 9 |
| 0 | D S U U U D S U U U |
| 1 | D S U U D D S U U D |
| 2 | D S U D D D S U D D |
| 3 | D S U U U D D D D D |
| 4 | D S U U D D D D D D |
| 5 | D S U D D D D D D D |
| 6 | D S U U U D S U U D |

FIG. 1 PRIOR ART ions and/or DL transmissions in a subframe performed by neighboring eNBs, when the eNB performs a DL transmission in the subframe to the UE. Throughputs of the eNB and the UE may be degraded due to the interferences.

METHOD OF HANDLING INTERFERENCE MITIGATION AND RELATED COMMUNICATION DEVICE

CROSS REFERENCE TO RELATED APPLICATIONS

This application claims the benefit of U.S. Provisional Application No. 61/820,718, filed on May 8, 2013 and incorporated herein by reference.

BACKGROUND OF THE INVENTION

1. Field of the Invention

The present invention relates to a method used in a wireless communication system and related communication device, and more particularly, to a method of handling an interference mitigation and related communication device.

2. Description of the Prior Art

A long-term evolution (LTE) system supporting the 3rd Generation Partnership Project (3GPP) Rel-8 standard and/or the 3GPP Rel-9 standard are developed by the 3GPP as a successor of a universal mobile telecommunications system (UMTS), for further enhancing performance of the UMTS to satisfy increasing needs of users. The LTE system includes a new radio interface and a new radio network architecture that provides a high data rate, low latency, packet optimization, and improved system capacity and coverage. In the LTE system, a radio access network known as an evolved universal terrestrial radio access network (E-UTRAN) includes multiple evolved Node-Bs (eNBs) for communicating with multiple user equipments (UEs), and for communicating with a core network including a mobility management entity (MME), a serving gateway, etc., for Non-Access Stratum (NAS) control.

A LTE-advanced (LTE-A) system, as its name implies, is an evolution of the LTE system. The LTE-A system targets faster switching between power states, improves performance at the coverage edge of an eNB, and includes advanced techniques, such as carrier aggregation (CA), coordinated multipoint (COMP) transmission/reception, uplink multiple-input multiple-output (UL-MIMO), etc. For a UE and an eNB to communicate with each other in the LTE-A system, the UE and the eNB must support standards developed for the LTE-A system, such as the 3GPP Rel-10 standard or later versions.

Different from the LTE/LTE-A system operating in a frequency-division duplexing (FDD) mode, transmission directions of subframes of a frequency band in the LTE/LTE-A system operating in a time-division duplexing (TDD) mode may be different. That is, the subframes in the same frequency band are divided into UL subframes, downlink (DL) subframes and special subframes according to the UL/DL configuration specified in the 3GPP standard.

Please refer to FIG. 1 which is a table 10 of the UL/DL configuration with subframes and corresponding transmission directions. In FIG. 1, 7 UL/DL configurations are shown, wherein each of the UL/DL configurations indicates a set of transmission directions for 10 subframes, respectively. In detail, "U" means that the subframe is a UL subframe where UL data is transmitted, and "D" means that the subframe is a DL subframe where DL data is transmitted. "S" means that the subframe is a special subframe where control information and may be data (according to a configuration of the special subframe) is transmitted.

However, eNBs in the LTE/LTE-A system operating in the TDD mode (hereinafter, the TDD system, for short) may be configured with various UL/DL configurations. In other words, a DL subframe for an eNB may be UL subframes for neighboring eNBs of the eNB, when the eNB and the neighboring eNBs are configured with different UL/DL configurations. In another example, a UL subframe for the eNB may be DL subframes for the neighboring eNBs of the eNB. In this situation, various combinations of interferences may be caused to the eNB or the UE. For example, the eNB may be interfered by interferences caused by UL transmissions and/or DL transmissions in a subframe performed by neighboring eNBs, when the eNB performs a DL transmission in the subframe to the UE. Throughputs of the eNB and the UE may be degraded due to the interferences.

Thus, it is important to mitigate the interferences caused to the eNB and the UE. Interference mitigation in the TDD system becomes an important problem to be solved.

SUMMARY OF THE INVENTION

The present invention therefore provides a method and related communication device for handling an interference mitigation in the TDD system to solve the abovementioned problem.

A method of handling interference mitigation for a first cell in a first cell cluster of a time-division duplexing (TDD) system comprises determining an interference mitigation for a communication operation between the first cell and a communication device in the TDD system, to reduce an interference caused by the communication operation to a second cell in a second cell cluster of the TDD system; and performing the communication operation according to the interference mitigation.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 1 is a table of the UL/DL configuration with subframes and corresponding transmission directions.

DETAILED DESCRIPTION

Figure 2:
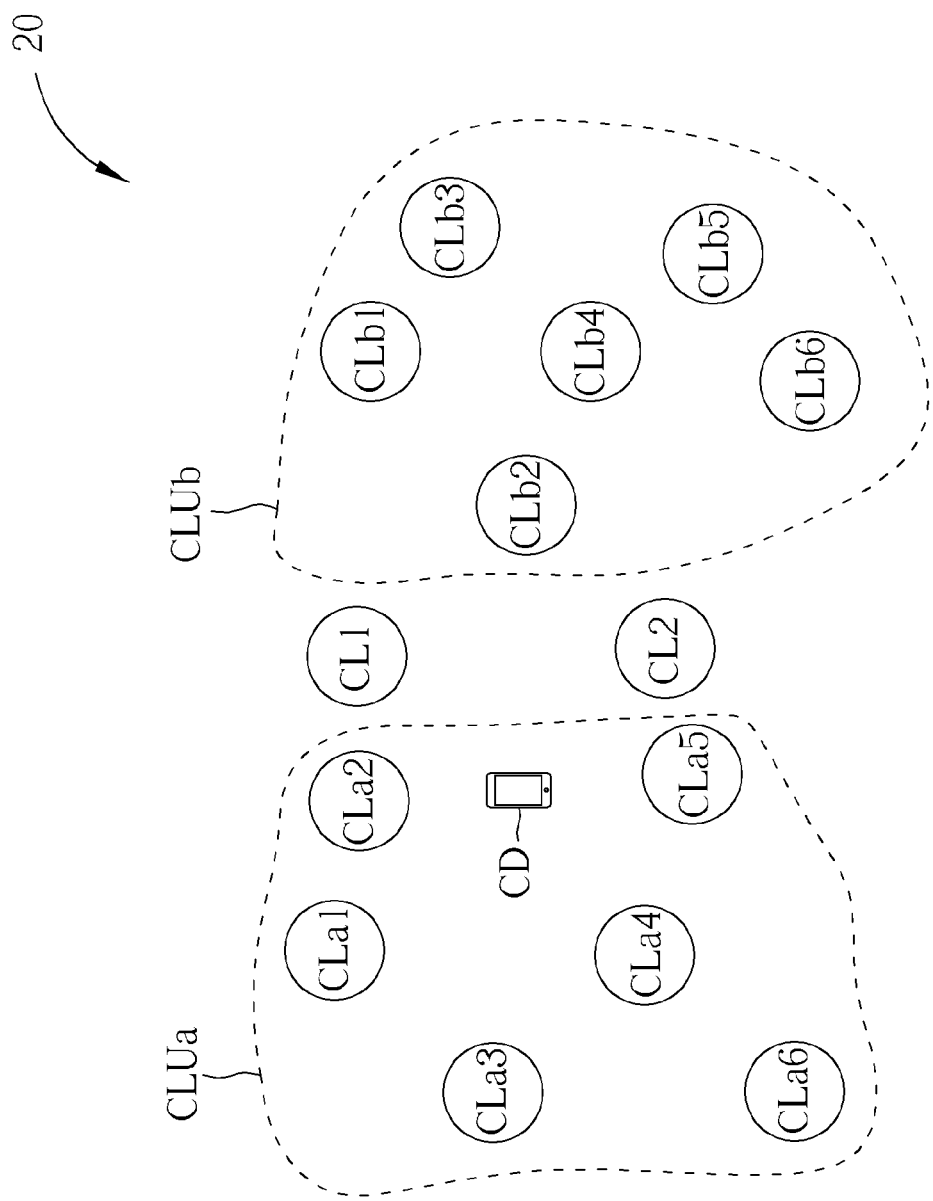
FIG. 2 is a schematic diagram of a wireless communication system according to an example of the present invention.

FIG. 2 is a schematic diagram of a wireless communication system 20 according to an example of the present invention. The wireless communication system 20 is briefly composed of a communication device CD, two cell clusters CLUa and CLUb and two cells CL1 and CL2, wherein the cell cluster CLUa includes cells CLa1-CLa6 and the cell cluster CLUb includes cells CLb1-CLb6. The cell CL1 (and the cell CL2) can be seen as not being clustered or as being self-clustered (a cluster with only itself). The cells CL1 and CL2 are used for illustrating possible realizations of the wireless communication system 20. In certain situations, the cells CL1 and CL2 may not exist. Similarly, the cell clusters CLUa and CLUb are used for illustrating possible realizations of the wireless communication system 20. The present invention can be readily applied to the case where a single cell cluster is considered.

Boundaries of the cells are denoted by respective circles, and coverage areas of the cells are areas within the boundaries, respectively. The coverage areas of the cells may be non-overlapped or partly overlapped, and are not limited to the non-overlapped coverage areas shown in FIG. 2.

The wireless communication system 20 supports a time-division duplexing (TDD) mode, hereinafter the TDD system 20 for short. That is, the communication device CD and the cells in the TDD system 20 may perform transmissions and/or receptions by using uplink (UL) subframes and downlink (DL) subframes according to one or more UL/DL configurations. For example, the cells CLa1-CLa6 may be configured with a first UL/DL configuration and the cells CLb1-CLb6 may be configured with a second UL/DL configuration, wherein the first UL/DL configuration and the second UL/DL configuration may be the same or different. In addition, the cells CL1 and CL2 may be configured with a third UL/DL configuration and a fourth UL/DL configuration, respectively. Similarly, the third UL/DL configuration and the fourth UL/DL configuration may be the same or different. In short, the UL/DL configurations of the cells in the TDD system 20 may be the same, partly the same or completely different.

In FIG. 2, the communication device CD and the cells are simply utilized for illustrating the structure of the TDD system 20. Practically, a cell (e.g., the cell CLa2) may be controlled (e.g., generated) by a Node-B (NB) in a universal mobile telecommunications system (UMTS). In another example, a cell (e.g., the cell CL1) may be controlled (e.g., generated) by an evolved NB (eNB) and/or a relay in a long term evolution (LTE) system, a LTE-Advanced (LTE-A) system or an evolution of the LTE-A system. That is, each of the cells CL1, CL2, CLa1-CLa6 and CLb1-CLb6 may be controlled by a respective NB, eNB or relay. In addition, a NB (or eNB or relay) may control multiple cells according to design of the TDD system 20. For example, the cells CLa1 and CLa2 may be controlled by the same NB (or the same eNB or the same relay). In another example, the abovementioned examples may also be applied to a base station conforming to wireless standards such as IEEE 802.11, IEEE 802.16, etc.

The communication device CD may be a user equipment (UE), a mobile station, a low cost device (e.g., machine type communication (MTC) device), a mobile phone, a laptop, a tablet computer, an electronic book or a portable computer system. In addition, a cell (e.g., any cell in the TDD system 20) and the communication device CD may be seen as a transmitter or a receiver according to direction (i.e., transmission direction), e.g., for an UL, the communication device CD is the transmitter and the cell is the receiver, and for a DL, the cell is the transmitter and the communication device CD is the receiver. More specifically, for the cell, the direction of the transmission is DL, and the direction of the reception is UL. For the communication device CD, the direction of the transmission is UL, and the direction of the reception is DL.

Figure 3:
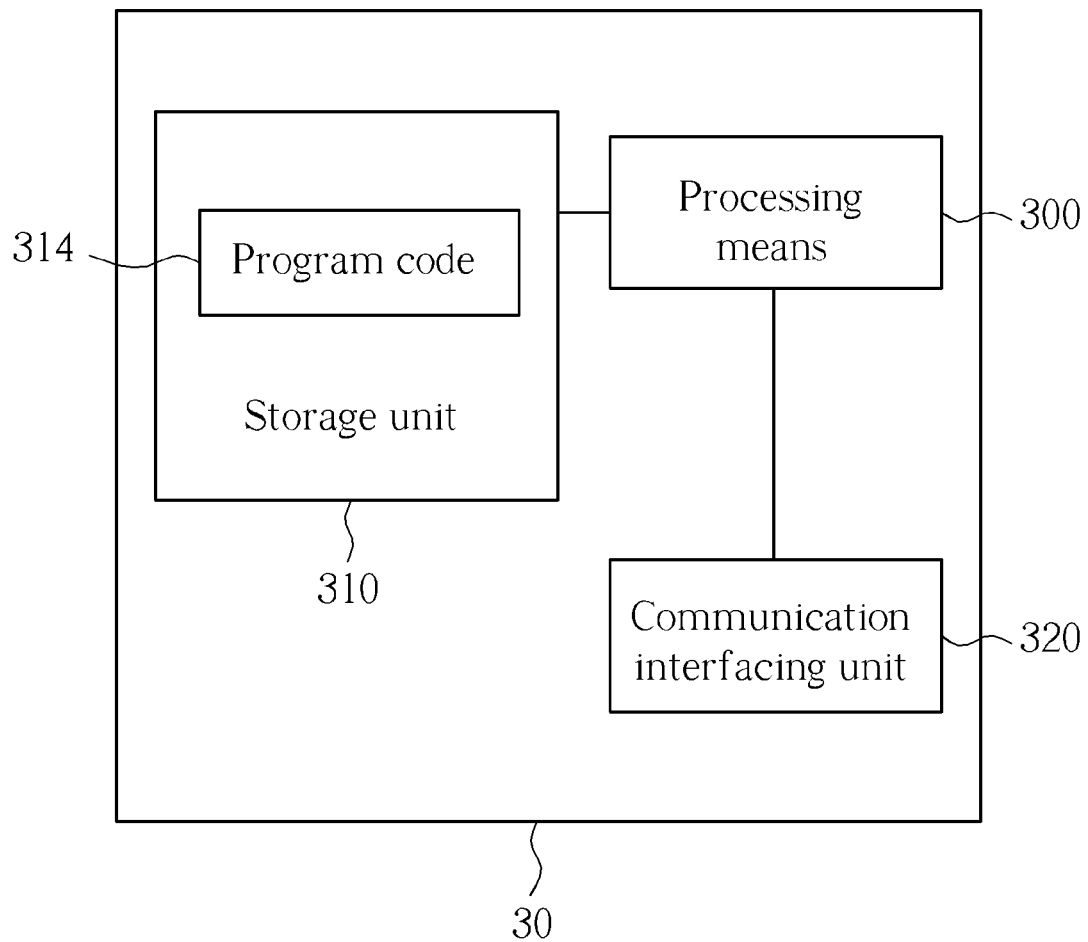
FIG. 3 is a schematic diagram of a communication device according to an example of the present invention.

Please refer to FIG. 3, which is a schematic diagram of a communication device 30 according to an example of the present invention. The communication device 30 may be used for realizing the communication device CD and/or a NB, an eNB, a relay or a base station generating a cell shown in FIG. 2, but is not limited herein. The communication device 30 may include a processing means 300 such as a microprocessor or Application Specific Integrated Circuit (ASIC), a storage unit 310 and a communication interfacing unit 320. The storage unit 310 may be any data storage device that can store a program code 314, accessed and executed by the processing means 300. Examples of the storage unit 310 include but are not limited to a subscriber identity module (SIM), read-only memory (ROM), flash memory, random-access memory (RAM), CD-ROM/DVD-ROM, magnetic tape, hard disk and optical data storage device. The communication interfacing unit 320 is preferably a transceiver and is used to transmit and receive signals (e.g., messages or packets) according to processing results of the processing means 300.

Figure 4:
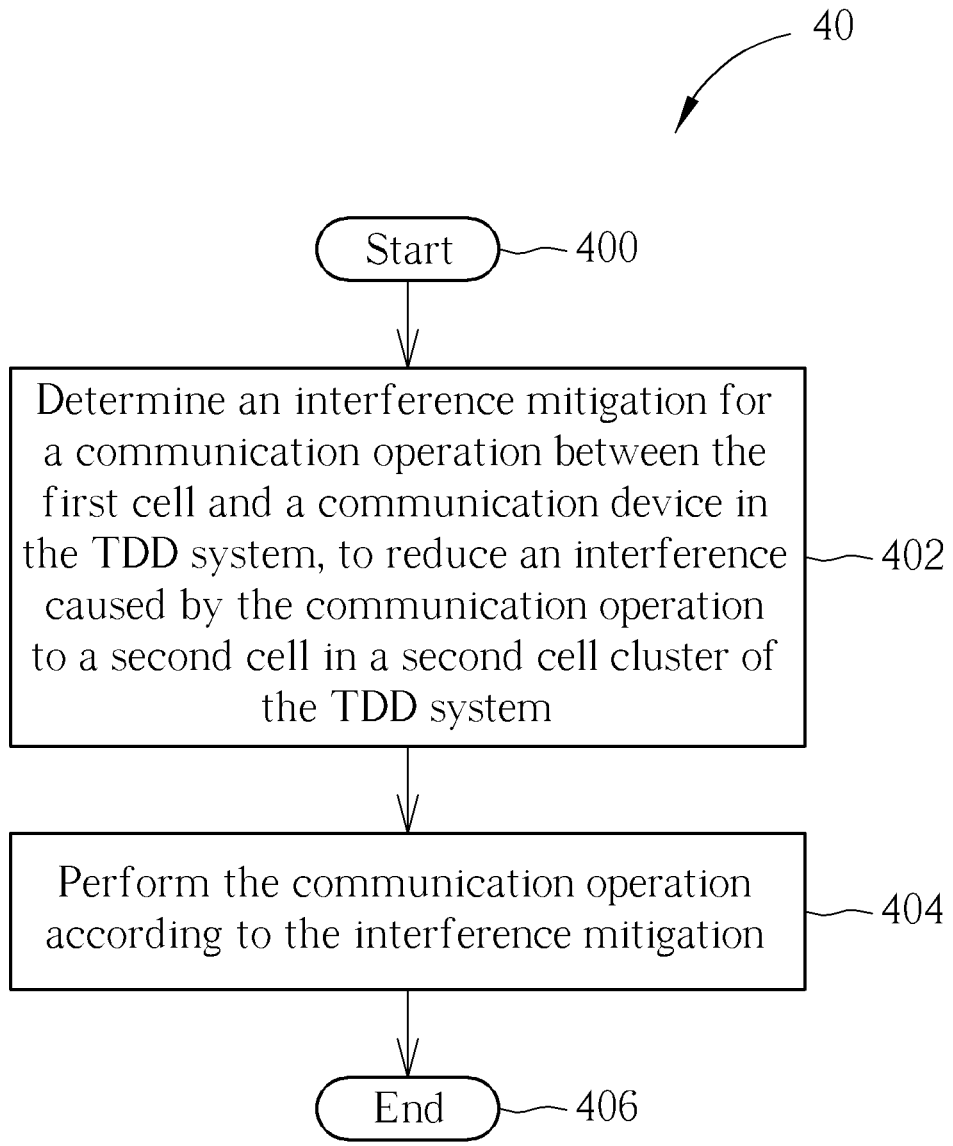
FIG. 4 is a flowchart of a process according to an example of the present invention.

Please refer to FIG. 4, which is a flowchart of a process 40 according to an example of the present invention. The process 40 may be utilized in a first cell (i.e., utilized in a NB, an eNB, a relay or a base station which controls the first cell) in a first cell cluster of the TDD system 20 shown in FIG. 2, for handling an interference mitigation. The process 40 may be compiled into the program code 314 and includes the following steps:

Step 400: Start.

Step 402: Determine an interference mitigation for a communication operation between the first cell and a communication device in the TDD system, to reduce an interference caused by the communication operation to a second cell in a second cell cluster of the TDD system.

Step 404: Perform the communication operation according to the interference mitigation.

Step 406: End.

According to the process 40, the first cell (e.g., the cell CLa2) determines an interference mitigation for a communication operation (e.g., transmission or reception) between the first cell and the communication device CD, to reduce an interference caused by the communication operation to a second cell (e.g., the cell CLa1, CLb2 or CL1) in a second cell cluster of the TDD system 20. Then, the first cell performs the communication operation according to the interference mitigation. That is, the first cell performs the communication operation while reducing the interference caused to the second cell (e.g., a neighboring cell). Impact to throughput of the second cell can be reduced. The process 40 may be seen as a soft interference mitigation because a UL/DL configuration of the first cell does not need to be changed. Thus, throughput of the TDD system 20 can be improved, and the improvement can be enlarged when the process 40 is realized in multiple cells of the TDD system 20.

Realization of the present invention is not limited to the above description. Terms in the process 40 are reused in the following examples for simplicity.

For example, the first cell (e.g., the cell CLa2) may notify the communication device CD to perform the communication operation according to the interference mitigation. That is, the first cell may realize the interference mitigation by itself as stated in the process 40, e.g., when the communication operation is a DL transmission. In addition, the first cell may notify the communication device CD to realize the interference mitigation, e.g., when the communication operation is a UL transmission. Thus, the interferences are mitigated when the communication operation is either the DL transmission or the UL transmission. In another example, the first cell and the communication device CD may cooperate to realize the interference mitigation.

There are various interference mitigation methods capable being used for realizing the present invention.

The first cell (e.g., the cell CLa5) may perform the communication operation via a reduced number of radio resource units (e.g., resource blocks (RBs), resource block groups (RBGs)). That is, the interference mitigation is realized by reducing the number of radio resource units allocated to the communication operation. Accordingly, less interference is caused to the second cell. For example, the first cell may perform the communication operation (e.g., DL transmission) via fewer radio resource units. In addition, the first cell may notify the communication device CD to perform the communication operation (e.g., UL transmission) via fewer radio resource units. The reduced number of radio resource units may be preferably lower than a regular number determined according to the prior art (e.g., standards), and may be a predetermined number or a dynamically configured number, and is not limited herein.

In addition, the first cell (e.g., the cell CLa2) may perform the communication operation with a reduced transmission power level. That is, the interference mitigation is realized by reducing the transmission power level for performing the communication operation. Accordingly, less interference is caused to the second cell. For example, the first cell may perform the communication operation (e.g., DL transmission) with a low transmission power level. In addition, the first cell may notify the communication device CD to perform the communication operation (e.g., UL transmission) with a low transmission power level. The reduced transmission power level may be preferably lower than a regular transmission power level determined according to the prior art (e.g., standards), and may be a predetermined value or a dynamically configured value, and is not limited herein.

In addition, the first cell (e.g., the cell CLa2) may assign a scheduling priority to the communication device CD according to a distance between the communication device CD and a base station of the first cell. Then, the first cell performs the communication operation according to the scheduling priority. That is, the interference mitigation may be realized by deferring the communication operation or by reducing an opportunity of performing the communication operation. Accordingly, less interference is caused to the second cell. For example, the first cell may assign a low scheduling priority to the communication device CD which is far from the base station of the first cell. The reason is that the communication device CD (or the first cell) needs to boost up the transmission power level for performing the communication operation in this situation, when the distance between the communication device CD and the base station is large. Accordingly, a larger interference may be caused to neighboring cells. The scheduling priority may be preferably lower than a regular scheduling priority determined according to the prior art (e.g., standards), and may be a predetermined priority or a dynamically configured priority, and is not limited herein.

On the other hand, a time instant at which the communication operation is performed (e.g., the interference mitigation applied) is not limited herein. For example, the communication operation may be performed in a first subframe (e.g., the fourth subframe) with a first transmission direction, and a second subframe (e.g., the fifth subframe) next to the first subframe is with a second transmission direction. That is, the communication operation may be performed when transmission directions of successive subframes (e.g., the fourth and fifth subframes) are different, e.g., the transmission direction of the present subframe is UL and the transmission direction of the next subframe is DL. In addition, the first cell (e.g., the cell CLa2) may be configured with a first UL/DL configuration, and the second cell (e.g., the cell CLb2) may be configured with a second UL/DL configuration. That is, the first cell and the second cell may be configured with different configurations. In this situation, transmission directions of a subframe determined according to the UL/DL configurations for performing the communication operation may be different. For example, the transmission direction of the subframe is UL according to the first UL/DL configuration, and is DL according to the second UL/DL configuration. In another example, the first cell (e.g., the cell CLa2) and the second cell (e.g., the cell CLa5) may be configured with the same configuration. In this situation, transmission directions of a subframe for performing the communication operation are the same.

In addition, the first cell cluster and the second cell cluster may be the same cell cluster (e.g., the cell cluster CLUa) or may be different cell clusters (e.g., the cell clusters CLUa and CLUb). A method according to which the interference mitigation is determined is not limited herein. For example, the first cell (e.g., the cell CLa2) may determine the interference mitigation by itself, e.g., according to measurement results received from communication devices or according to a number of retransmissions. In another example, the first cell (e.g., the cell CLa2) may determine the interference mitigation according to system information received from the second cell (e.g., the cell CL1). That is, the first cell and the second cell may cooperate to determine the interference mitigation. In addition, positions of the first cell and the second cell are not limited herein. For example, the first cell (e.g., the cell CLa5) may be near an edge of a coverage area of the first cell cluster, e.g., the dotted line of the cell cluster CLUa. In addition, the second cell (e.g., the cell CLb2) may be near an edge of a coverage area of the second cell cluster, e.g., the dotted line of the cell cluster CLUb.

Please note that, the above examples are illustrated based on that the first cell (or the corresponding communication device) performs a communication operation according to an interference mitigation, to mitigate an interference caused by the communication operation to the second cell. The present invention can readily be extended to the case of multiple cells. For example, a cell (e.g., the cell CLa2) performs a communication operation (e.g., a DL transmission) according to an interference mitigation, to mitigate interferences caused by the communication operations to a set of cells (e.g., the cells CL1 and CLb2). In another example, communication devices communicating with the first cell may be notified, to perform communication operations (e.g., UL transmissions) according to the interference mitigation.

In addition, as known by those skilled in the art, it means that a cell is controlled (i.e., generated) by eNB, NB, relay or a base station to perform a communication operation, when a statement such as the cell performs the communication operation is used. In general, an interference mitigation is realized at a transmitter which performs a DL transmission (when the transmitter is a cell) or a UL transmission (when the transmitter is a communication device). For example, the cell performs the communication operation which is a DL transmission according to the interference mitigation. However, in certain situations, a receiver may need to perform a corresponding reception according to the interference mitigation. Thus, the case that the cell performs the communication operation which is a reception according to the interference mitigation is included in the present invention. Similarly, the case that the cell notifies a communication device to perform the communication operation which is a reception according to the interference mitigation is also included in the present invention.

The interference mitigation based on the cell clustering may be applied to a dynamic TDD system to simplify planning/configuring of UL/DL configurations of the cells and to reduce interferences to nearby cells. In the dynamic TDD system, some cells might be grouped into a cell cluster so that all the cells in the cell cluster set are configured with the same UL/DL configuration. The soft interference mitigation proposed in the present invention may be applied to a set of cells which suffers a greater interference, e.g., greater than a predetermined interference level. For example, the greater interference may be caused by a process related to a cell cluster re-organization, e.g., a clustering process for forming a cell cluster, a de-clustering process for splitting a cell cluster into two or more cell clusters.

Figure 5:
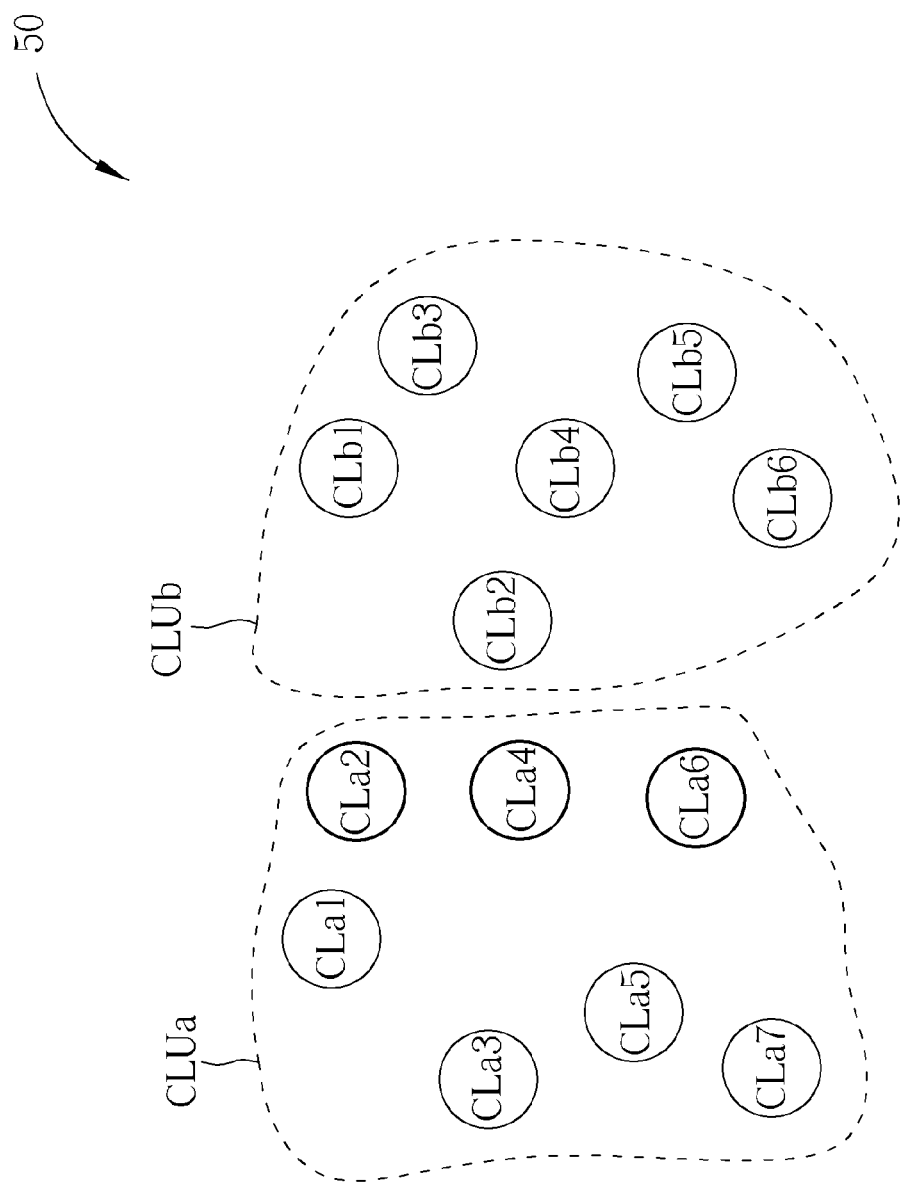
FIG. 5 is a schematic diagram of a wireless communication system according to an example of the present invention.

FIG. 5 is a schematic diagram of a TDD system 50 according to an example of the present invention. The TDD system 50 is briefly composed of two cell clusters CLUa and CLUb, wherein the cell cluster CLUa includes cells CLa1-CLa7 and the cell cluster CLUb includes cells CLb1-CLb6. The present invention (e.g., the process 40 and/or the abovementioned description) can be realized in the cells CLa2, CLa4 and CLa6 to reduce interferences, because these cells are near the edge of the cell cluster CLUa and cause greater interferences to the cells (e.g., cell CLb2) in the neighboring cell cluster (i.e., the cell cluster CLUb).

Figure 6:
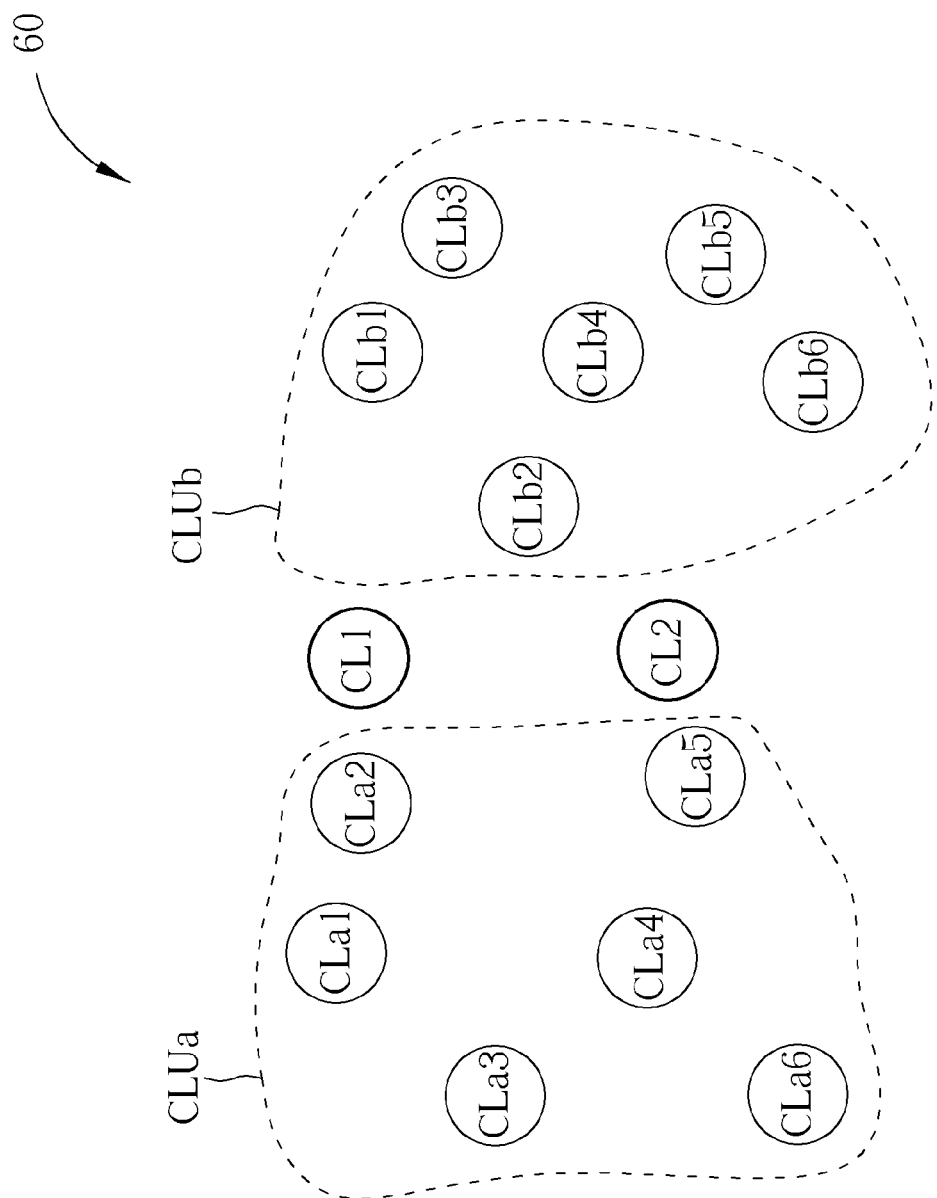
FIG. 6 is a schematic diagram of a wireless communication system according to an example of the present invention.

FIG. 6 is a schematic diagram of a TDD system 60 according to an example of the present invention. The TDD system 60 is briefly composed of two cell clusters CLUa and CLUb and two cells CL1 and CL2, wherein the cell cluster CLUa includes cells CLa1-CLa6 and the cell cluster CLUb includes cells CLb1-CLb6. The present invention (e.g., the process 40 and/or the abovementioned description) can be realized in the cells CL1 and CL2 to reduce interferences, because these cells are near the edge of the cell clusters CLUa and CLUb and cause greater interferences to the cells (e.g., the cells CLa2, CLa5 and CLb2) in both the cell clusters CLUa and CLUb.

Figure 7:
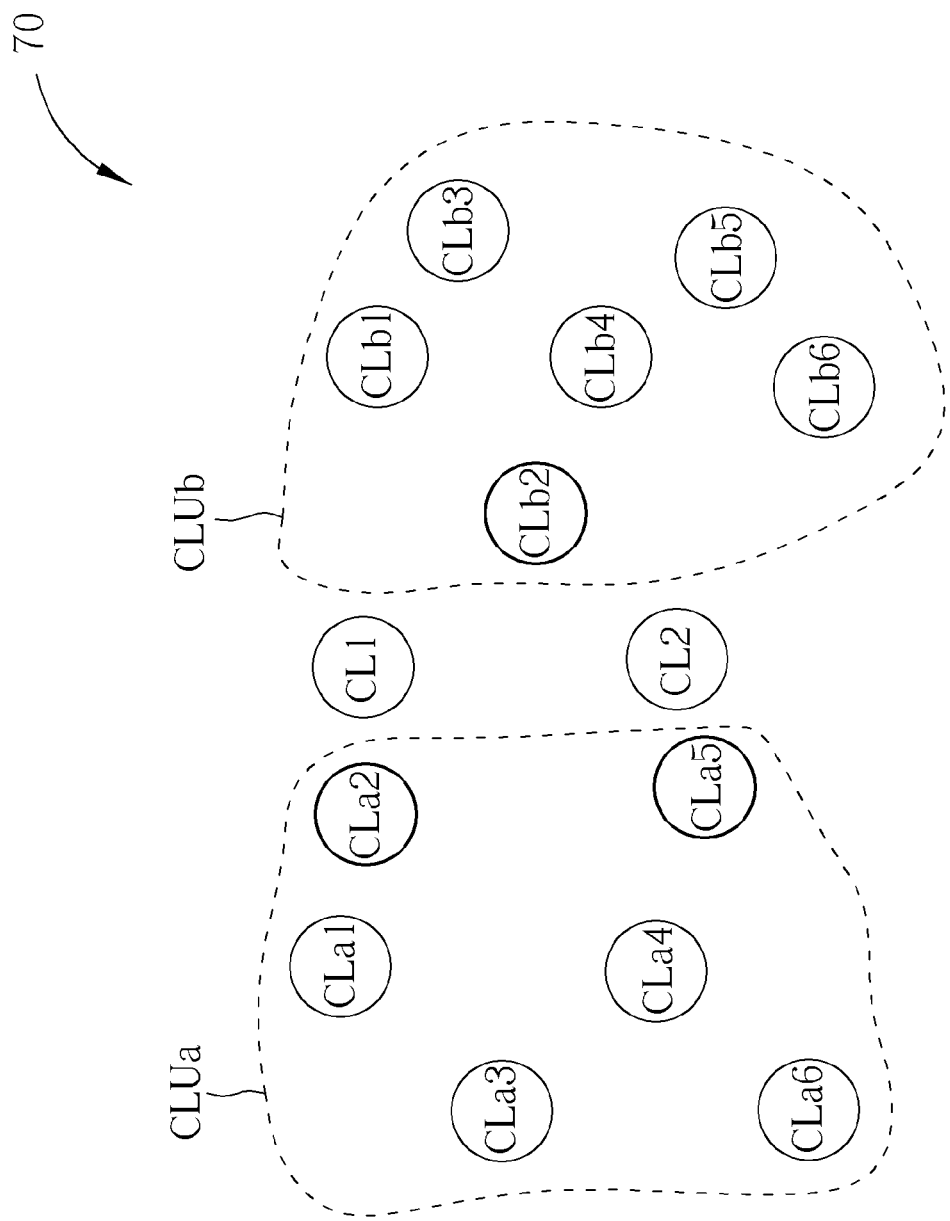
FIG. 7 is a schematic diagram of a wireless communication system according to an example of the present invention.

FIG. 7 is a schematic diagram of a TDD system 70 according to an example of the present invention. The TDD system 70 is briefly composed of two cell clusters CLUa and CLUb and two cells CL1 and CL2, wherein the cell cluster CLUa includes cells CLa1-CLa6 and the cell cluster CLUb includes cells CLb1-CLb6. The present invention (e.g., the process 40 and/or the abovementioned description) can be realized in the cells CLa2, CLa5 and CLb2 to reduce interferences, because these cells are near the edge of the cell clusters CLUa and CLUb and cause greater interferences to the cells (e.g., the cells CL1 and CL2) outside the cell clusters CLUa and CLUb.

Figure 8:
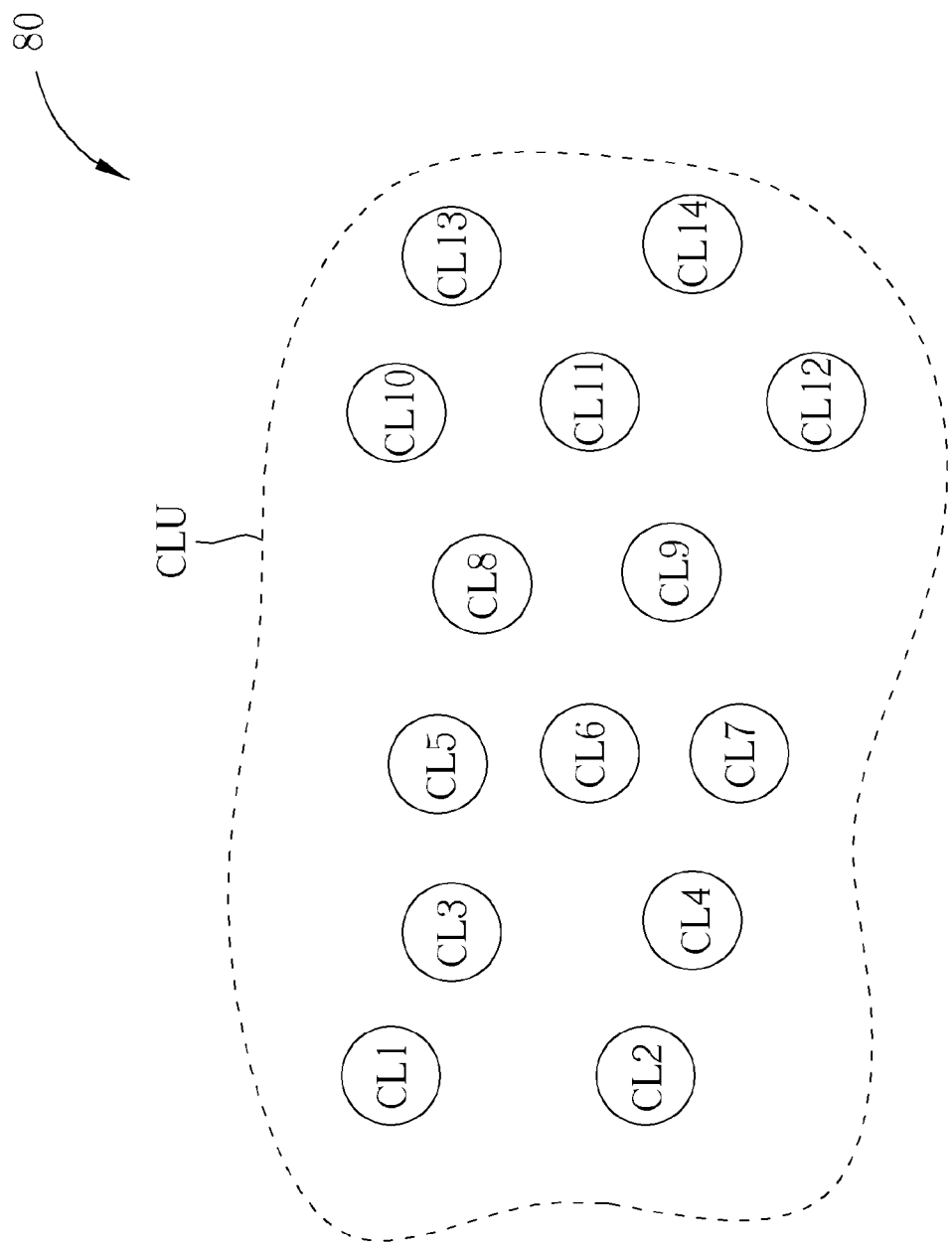
FIG. 8 is a schematic diagram of a wireless communication system according to an example of the present invention.

FIG. 8 is a schematic diagram of a TDD system 80 according to an example of the present invention. The TDD system 80 is briefly composed of a cell cluster CLU, wherein the cell cluster CLU includes cells CL1-CL14. A de-clustering process is going to be performed on the cell cluster CLU, to split the cell cluster CLU into two (or more) cell clusters. The present invention (e.g., the process 40 and/or the abovementioned description) can be realized in the cells CL5-CL9 before the de-clustering process begins (or during the de-clustering process) to reduce interferences, because these cells may be near the edge of the cell clusters after the de-clustering process and may cause greater interferences to neighboring cells.

As can be seen from the above examples, the present invention can be realized in various sets of cells at various time instants to mitigate interferences, so as to improve throughput of the TDD system.

Those skilled in the art should readily make combinations, modifications and/or alterations on the abovementioned description and examples. The abovementioned steps of the processes including suggested steps can be realized by means that could be a hardware, a firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include a system on chip (SOC), system in package (SiP), a computer on module (COM), and the communication device 30.

To sum up, the present invention provides a method of handling an interference mitigation. Thus, throughput of a TDD system where the interference mitigation is realized can be improved, and the improvement can be enlarged when the interference mitigation is realized in multiple cells of the TDD system.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling interference mitigation for a first cell in a first cell cluster of a time-division duplexing (TDD) system, the method comprising:

determining an interference mitigation for a communication operation between the first cell and a communication device in the TDD system, to reduce an interference caused by the communication operation to a second cell in a second cell cluster of the TDD system; and performing the communication operation according to the interference mitigation, wherein the communication operation is performed via a reduced number of radio resource units and is performed with a reduced transmission power level and the communication device is notified to perform the communication operation according to the interference mitigation;

wherein all cells in the first cell cluster are configured with a first uplink (UL)/downlink (DL) configuration, and all cells in the second cell cluster are configured with a second UL/DL configuration;

wherein the first cell is near an edge of a coverage area of the first cell cluster, and the second cell is near an edge of a coverage area of the second cell cluster;

wherein the first cell determines the interference mitigation according to system information received from the second cell;

wherein the communication operation is performed in a first subframe with a first transmission direction, and a second subframe next to the first subframe is with a second transmission direction.

2. The method of claim 1, wherein the step of performing the communication operation according to the interference mitigation comprises steps of:
- assigning a scheduling priority to the communication device according to a distance between the communication device and a base station of the first cell; and
- performing the communication operation according to the scheduling priority.

3. The method of claim 1, wherein the communication operation is performed in a subframe, and transmission directions of the subframe determined according to the first UL/DL configuration and the second UL/DL configuration are different.

4. The method of claim 1, wherein the communication operation is performed in a subframe, and transmission directions of the subframe determined according to the first UL/DL configuration and the second UL/DL configuration are the same.

5. A base station for handling interference mitigation for a first cell in a first cell cluster of a time-division duplexing (TDD) system, comprising:
- a storage device, for storing instructions of:
  - determining an interference mitigation for a communication operation between the first cell and a communication device in the TDD system, to reduce an interference caused by the communication operation to a second cell in a second cell cluster of the TDD system; and
  - performing the communication operation according to the interference mitigation, wherein the communication operation is performed via a reduced number of radio resource units and is performed with a reduced transmission power level and the communication device is notified to perform the communication operation according to the interference mitigation;
- wherein all cells in the first cell cluster are configured with a first uplink (UL)/downlink (DL) configuration, and all cells in the second cell cluster are configured with a second UL/DL configuration;
- wherein the first cell is near an edge of a coverage area of the first cell cluster, and the second cell is near an edge of a coverage area of the second cell cluster;
- wherein the first cell determines the interference mitigation according to system information received from the second cell;
- wherein the communication operation is performed in a first subframe with a first transmission direction, and a second subframe next to the first subframe is with a second transmission direction; and
- a processing circuit, coupled to the storage device, configured to execute the instructions stored in the storage device.

* * * * *